US011355262B2

(12) United States Patent
Wiekhorst et al.

(10) Patent No.: US 11,355,262 B2
(45) **Date of Patent: *Jun. 7, 2022**

(54) COMMUNICATION WIRE

(71) Applicant: CommScope Technologies LLC, Hickory, NC (US)

(72) Inventors: David Wiekhorst, Potter, NE (US); Spring Stutzman, Sidney, NE (US); Jeff Stutzman, Sidney, NE (US); Scott Avery Juengst, Sidney, NE (US); Frederick W. Johnston, Dalton, NE (US); Jim L. Dickman, Sidney, NE (US); Robert Kenny, Cincinnati, OH (US)

(73) Assignee: CommScope Technologies LLC, Hickory, NC (US)

(*) Notice: Subject to any disclaimer, the term of this patent is extended or adjusted under 35 U.S.C. 154(b) by 0 days.

This patent is subject to a terminal disclaimer.

(21) Appl. No.: 16/355,072

(22) Filed: Mar. 15, 2019

(65) Prior Publication Data

US 2019/0279785 A1 Sep. 12, 2019

Related U.S. Application Data

(63) Continuation of application No. 15/148,523, filed on May 6, 2016, now Pat. No. 10,242,767, which is a (Continued)

(51) Int. Cl.
*G02B 6/036* (2006.01)
*H01B 7/02* (2006.01)

(Continued)

(52) U.S. Cl.
CPC ........... *H01B 7/0233* (2013.01); *G02B 6/443* (2013.01); *H01B 1/02* (2013.01); *H01B 7/0275* (2013.01); *H01B 7/295* (2013.01); *H01B 11/12* (2013.01)

(58) Field of Classification Search
CPC ...................................................... G02B 6/036

(Continued)

(56) References Cited

U.S. PATENT DOCUMENTS

| | | | |
|---|---|---|---|
| 326,021 | A | 9/1885 | Cruickshank |
| 504,397 | A | 9/1893 | Marsh |

(Continued)

FOREIGN PATENT DOCUMENTS

| | | |
|---|---|---|
| BE | 539772 | 7/1959 |
| CA | 524452 | 5/1956 |

(Continued)

OTHER PUBLICATIONS

International Search Report for International Application No. PCT/US2003/28040 dated Jan. 23, 2004 (3 pp.).

(Continued)

*Primary Examiner* — Chau N Nguyen
(74) *Attorney, Agent, or Firm* — Merchant & Gould P.C.

(57) ABSTRACT

The present invention relates to an improved insulated conductor with a low dielectric constant and reduced materials costs. The conductor (12) extends along a longitudinal axis and an insulation (14, 14<1>) surrounds the conductor (12). At least on channel (16, 16<1>) in the insulation (14, 14<1>) extends generally along the longitudinal axis to form an insulated conductor. Apparatuses and methods of manufacturing the improved insulated conductors are also disclosed.

14 Claims, 5 Drawing Sheets

Related U.S. Application Data continuation of application No. 14/177,843, filed on Feb. 11, 2014, now Pat. No. 9,336,928, which is a continuation of application No. 12/413,129, filed on Mar. 27, 2009, now Pat. No. 8,664,531, which is a continuation of application No. 10/529,067, filed as application No. PCT/US03/28040 on Sep. 8, 2003, now Pat. No. 7,511,225, which is a continuation-in-part of application No. 10/389,254, filed on Mar. 14, 2003, now Pat. No. 7,214,880, which is a continuation-in-part of application No. 10/321,296, filed on Dec. 16, 2002, now Pat. No. 6,743,983, which is a continuation-in-part of application No. 10/253,212, filed on Sep. 24, 2002, now abandoned.

(51) Int. Cl.

| | |
|---|---|
| ***G02B 6/44*** | (2006.01) |
| ***H01B 7/295*** | (2006.01) |
| ***H01B 11/12*** | (2006.01) |
| ***H01B 1/02*** | (2006.01) |

(58) Field of Classification Search
USPC ................................ 385/123, 125, 127, 109
See application file for complete search history.

(56) References Cited

U.S. PATENT DOCUMENTS 1,008,370 A 11/1911 Robillot
2,386,818 A 10/1945 Seavey
2,551,710 A * 5/1951 Slaughter ................ F21V 17/04 362/355
2,556,244 A 6/1951 Weston
2,583,026 A 1/1952 Swift
2,690,592 A 10/1954 Schanz
2,708,176 A 5/1955 Rhodes
2,766,481 A 10/1956 Henning
2,804,494 A 8/1957 Fenton
2,949,589 A 8/1960 Hafner
3,035,115 A 5/1962 Heckel et al.
3,064,073 A 11/1962 Downing et al.
3,086,557 A 4/1963 Peterson
3,240,233 A * 3/1966 Johnston ................ B21C 43/04 138/108
3,422,648 A 1/1969 Lemelson
3,473,986 A 10/1969 Hureau
3,644,659 A 2/1972 Campbell
3,678,177 A 7/1972 Lawrenson
3,712,705 A * 1/1973 Marcatili ................ G02B 6/02 385/125
3,771,934 A 11/1973 Delves-Broughton
3,812,282 A 5/1974 Johansson
3,892,912 A 7/1975 Hauck
3,901,674 A * 8/1975 Strack .................. C03B 37/027 65/412
3,905,853 A 9/1975 Stent
3,911,070 A 10/1975 Lundsager
3,972,970 A 8/1976 Taylor
3,983,313 A 9/1976 Ney et al.
4,050,867 A 9/1977 Ferrentino et al.
4,132,756 A 1/1979 Ferrentino et al.
4,138,457 A 2/1979 Rudd et al.
4,181,486 A 1/1980 Saito
4,321,228 A 3/1982 de Kok
4,527,140 A * 7/1985 Kimura .................. H01F 38/30 174/153 G
4,688,890 A * 8/1987 DeMeo ................ G02B 6/4463 138/108
4,731,505 A 3/1988 Crenshaw et al.
4,745,238 A 5/1988 Kotthaus et al.
4,777,325 A 10/1988 Siwinski
5,132,488 A 7/1992 Tessier et al.
5,162,120 A 11/1992 Baxter et al.
5,286,923 A 2/1994 Prudhon et al.
5,514,837 A 5/1996 Kenny et al.
5,576,515 A 11/1996 Bleich et al.
5,678,609 A * 10/1997 Washburn ................ F16L 3/26 138/107
5,742,002 A 4/1998 Arredondo et al.
5,744,757 A 4/1998 Kenny et al.
5,796,044 A 8/1998 Cobian et al.
5,796,046 A 8/1998 Newmoyer et al.
5,821,467 A 10/1998 O'Brien et al.
5,922,155 A 7/1999 Clouet et al.
5,936,205 A 8/1999 Newmoyer
5,969,295 A 10/1999 Boucino et al.
5,990,419 A 11/1999 Bogese, II
6,064,008 A 5/2000 Craton
6,112,770 A * 9/2000 Walsh ................. H02G 3/0481 138/108
6,150,612 A 11/2000 Grandy et al.
6,153,826 A 11/2000 Kenny et al.
6,162,992 A 12/2000 Clark et al.
6,211,467 B1 4/2001 Berelsman et al.
6,254,924 B1 7/2001 Brorein et al.
6,303,867 B1 10/2001 Clark et al.
6,323,427 B1 11/2001 Rutledge
6,431,904 B1 8/2002 Berelsman
6,452,105 B2 9/2002 Badii et al.
6,465,737 B1 10/2002 Bonato et al.
6,476,323 B2 11/2002 Beebe et al.
6,476,326 B1 11/2002 Fuzier et al.
6,555,753 B2 4/2003 Rutledge et al.
6,573,456 B2 6/2003 Spruell et al.
6,743,983 B2 6/2004 Wiekhorst et al.
6,750,401 B2 * 6/2004 Vokey ................. H01B 7/0233 174/11 OF
6,815,617 B1 11/2004 Gebs et al.
7,049,519 B2 5/2006 Wiekhorst et al.
7,214,880 B2 5/2007 Wiekhorst et al.
7,238,886 B2 7/2007 Wiekhorst et al.
7,511,225 B2 * 3/2009 Wiekhorst ........... H01B 7/0233 174/113 R
7,560,648 B2 7/2009 Wiekhorst et al.
8,525,030 B2 9/2013 Wiekhorst et al.
8,624,116 B2 1/2014 Wiekhorst
2004/0149483 A1 8/2004 Glew
2004/0168821 A1 9/2004 Goto

FOREIGN PATENT DOCUMENTS

| | | |
|---|---|---|
| DE | 2133453 | 1/1973 |
| EP | 1 081 720 | 3/2001 |
| GB | 725624 | 3/1955 |
| GB | 811703 | 4/1959 |
| WO | WO 01/81969 | * 11/2001 |

OTHER PUBLICATIONS

Prosecution History of U.S. Appl. No. 10/253,212 (Abandoned) (Notice of Abandonment dated Jul. 27, 2005; Notice of Allowance dated Dec. 1, 2003; Resp. dated Sep. 5, 2003; OA dated Jun. 30, 2003).

Prosecution History of U.S. Appl. No. 10/321,296 (Notice of Allowance dated Nov. 12, 2003; Resp. dated Sep. 5, 2003; Interview Summary dated Aug. 29, 2003; OA dated Jul. 22, 2003; Resp. dated Jun. 27, 2003; OA dated May 30, 2003).

Prosecution History of U.S. Appl. No. 10/389,254 (Suppl. Notice of Allowance dated Apr. 4, 2007; Suppl. Notice of Allowance dated Sep. 25, 2006; Notice of Allowance dated Jun. 9, 2006; Resp. dated May 19, 2006; OA dated Mar. 23, 2006; Resp. dated Jan. 3, 2006; OA dated Oct. 3, 2005; Resp. dated Aug. 22, 2005; Advisory Action dated Aug. 15, 2005; Resp. dated Jul. 20, 2005; OA dated May 20, 2005; Resp. dated Feb. 22, 2005; OA dated Oct. 20, 2004; Resp. dated Sep. 14, 2004; Advisory Action dated Aug. 19, 2004; Resp. dated Jul. 13, 2004; OA dated May 14, 2004; Resp. dated Feb. 17, 2004; OA dated Sep. 15, 2003; Resp dated Jul. 30, 2003; OA dated Jul. 2, 2003).

(56) References Cited

OTHER PUBLICATIONS

Prosecution History of U.S. Appl. No. 10/790,583 (Notice of Allowance dated Feb. 27, 2007; Resp. dated Nov. 8, 2006; Interview Summary dated Nov. 7, 2006; OA dated Oct. 10, 2006; Resp. dated Jun. 23, 2006; OA dated Mar. 23, 2006; Resp. dated Mar. 6, 2006; OA dated Oct. 5, 2005; Resp. dated Jul. 18, 2005; OA dated Apr. 5, 2005; Resp. dated Feb. 17, 2005; OA dated Nov. 17, 2004).

Prosecution History of U.S. Appl. No. 11/094,860 (Notice of Allowance dated Jan. 20, 2006; Proposed Second Suppl. Amendment dated Jan. 12, 2006; Proposed Amendments dated Jan. 11, 2006; Proposed Amendments dated Jan. 11, 2006; Suppl. Amendment dated Dec. 27, 2005; Resp. dated Dec. 13, 2005; OA dated Sep. 13, 2005; Resp. dated Jul. 19, 2005; OA dated Jun. 6, 2005.

Prosecution History of U.S. Appl. No. 11/095,280 (Resp. dated May 22, 2008; OA dated Dec. 27, 2007; Resp. dated Oct. 30, 2007; OA dated May 10, 2007; Appeal Brief Mar. 23, 2007; Advisory Action dated Feb. 22, 2007; Resp. dated Jan. 25, 2007; OA dated Sep. 25, 2006; Resp. dated Jun. 23, 2006; OA dated Mar. 23, 2006; Resp. dated Dec. 27, 2005; OA dated Aug. 24, 2005; Resp. dated Jun. 20, 2005; OA dated May 19, 2005).

* cited by examiner

COMMUNICATION WIRE

CROSS-REFERENCE TO RELATED APPLICATIONS

This application is a Continuation of U.S. application Ser. No. 15/148,523, filed 6 May 2016, now U.S. Pat. No. 10,242,767; which is a Continuation of U.S. application Ser. No. 14/177,843, filed 11 Feb. 2014, now U.S. Pat. No. 9,336,928; which is a Continuation of U.S. application Ser. No. 12/413,129, filed 27 Mar. 2009, now U.S. Pat. No. 8,664,531; which is a Continuation of U.S. application Ser. No. 10/529,067 filed 6 Jan. 2006, now U.S. Pat. No. 7,511,225; which is a National Stage of PCT/US2003/028040 filed 8 Sep. 2003; which is a Continuation-In-Part of U.S. application Ser. No. 10/389,254, filed 14 Mar. 2003, now U.S. Pat. No. 7,214,880; which is a Continuation-In-Part of U.S. application Ser. No. 10/321,296, filed 16 Dec. 2002, now U.S. Pat. No. 6,743,983; which is a Continuation-In-Part of U.S. application Ser. No. 10/253,212, filed 24 Sep. 2002, now abandoned; which applications are incorporated herein by reference. To the extent appropriate, a claim of priority is made to each of the above disclosed applications.

FIELD OF THE INVENTION

The present invention relates to an improved wire and methods of making the same.

BACKGROUND OF THE INVENTION

One method of transmitting data and other signals is by using twisted pairs. A twisted pair includes at least one pair of insulated conductors twisted about one another to form a two conductor pair. A number of methods known in the art may be employed to arrange and configure the twisted pairs into various high-performance transmission cable arrangements. Once the twisted pairs are configured into the desired "core," a plastic jacket is typically extruded over them to maintain their configuration and to function as a protective layer. When more than one twisted pair group is bundled together, the combination is referred to as a multi-pair cable.

In cabling arrangements where the conductors within the wires of the twisted pairs are stranded, two different, but interactive sets of twists can be present in the cable configuration. First, there is the twist of the wires that make up the twisted pair. Second, within each individual wire of the twisted pair, there is the twist of the wire strands that form the conductor. Taken in combination, both sets of twists have an interrelated effect on the data signal being transmitted through the twisted pairs.

With multi-pair cables, the signals generated at one end of the cable should ideally arrive at the same time at the opposite end even if they travel along different twisted pair wires. Measured in nanoseconds, the timing difference in signal transmissions between the twisted wire pairs within a cable in response to a generated signal is commonly referred to as "delay skew." Problems arise when the delay skew of the signal transmitted by one twisted pair and another is too large and the device receiving the signal is not able to properly reassemble the signal. Such a delay skew results in transmission errors or lost data.

Moreover, as the throughput of data is increased in high-speed data communication applications, delay skew problems can become increasingly magnified. Even the delay in properly reassembling a transmitted signal because of signal skew will significantly and adversely affect signal throughput. Thus, as more complex systems with needs for increased data transmission rates are deployed in networks, a need for improved data transmission has developed. Such complex, higher-speed systems require multi-pair cables with stronger signals, and minimized delay skew.

The dielectric constant (DK) of the insulation affects signal throughput and attenuation values of the wire. That is, the signal throughput increases as the DK decreases and attenuation decreases as DK decreases. Together, a lower DK means a stronger signal arrives more quickly and with less distortion. Thus, a wire with a DK that is lower (approaching 1) is always favored over an insulated conductor with a higher DK, e.g., greater than 2.

In twisted pair applications, the DK of the insulation affects the delay skew of the twisted pair. Generally accepted delay skew, according to EIA/TIA 568-A-1, is that both signals should arrive within 45 nanoseconds (ns) of each other, based on 100 meters of cable. A delay skew of this magnitude is problematic when high frequency signals (greater than 100 MHz) are being transmitted. At these frequencies, a delay skew of less than 20 ns is considered superior and has yet to be achieved in practice.

In addition, previously, the only way to affect the delay skew in a particular twisted pair or multi-pair cable was to adjust the lay length or degree of twist of the insulated conductors. This in turn required a redesign of the insulated conductor, including changing the diameter of the conductor and the thickness of the insulation to maintain suitable electrical properties, e.g., impedance and attenuation."

One attempt at an improved insulated conductor included the use of ribs on the exterior surface of the insulation or channels within the insulation but close to the exterior surface of the insulation. The ribbed insulation, however, was unsatisfactory because it was difficult, if not impossible, to make the insulation with exterior surface features. Because of the nature of the insulation material used and the nature of process used, exterior surface features would be indistinct and poorly formed. Instead of ribs with sharp edges, the ribs would end as rounded mounds. The rounded result is an effect of using materials that do not hold their shape well and of using an extrusion die to form the surface features. Immediately after leaving the extrusion die, the insulation material tends to surge and expand. This surging rounds edges and fills in spaces between features.

Insulated conductors with ribbed insulation also produced cabling with poor electrical properties. The spaces between ribs may be contaminated with dirt and water. These contaminants negatively affect the DK of the insulated conductor because the contaminants have DKs that are widely varying and typically much higher than the insulation material. The varying DKs of the contaminants will give the overall insulated conductor a DK that varies along its length, which will in turn negatively affect signal speed. Likewise, contaminants with higher DK will raise the overall DK of the insulation, which also negatively affects signal speed.

Insulated conductors with ribbed and channeled insulation also produced cabling with poor physical properties, which in turn degraded the electrical properties. Because of the limited amount of material near the exterior surface of ribbed and known channeled insulation, such insulated conductors have unsatisfactorily low crush strengths; so low that the insulated conductors may not even be able to be spooled without deforming the ribs and channels of the insulation. From a practical standpoint, this is unacceptable because it makes manufacture, storage and installation of this insulated conductor nearly impossible.

The crushing of the ribs and channels, or otherwise physically stressing the insulation, will change the shape of these features. This will negatively influence the DK of insulation. One type of physical stressing that is a necessary part of cabling is twisting a pair of insulated conductors together. This type of torsional stress cannot be avoided. Thus, the very act of making a twisted pair may severely compromise the electrical property of these insulated conductors.

Another area of concern in the wire and cable field is how the wire performs in a fire. The National Fire Prevention Association (NFPA) set standards for how materials used in residential and commercial buildings burn. These tests generally measure the amount of smoke given off, the smoke density, rate of flame spread and/or the amount of heat generated by burning the insulated conductor. Successfully completing these tests is an aspect of creating wiring that is considered safe under modern fire codes. As consumers become more aware, successful completion of these tests will also be a selling point.

Known materials for use in the insulation of wires, such as fluoropolymers, have desirable electrical properties such as low DK. But fluoropolymers are comparatively expensive. Other compounds are less expensive but do not minimize DK, and thus delay skew, to the same extent as fluoropolymers. Furthermore, non-fluorinated polymers propagate flame and generate smoke to a greater extent than fluoropolymers and thus are less desirable material to use in constructing wires.

Thus, there is a need for a wire that addresses the limitations of the prior art to effectively minimize delay skew and provide high rates of transmission while also being cost effective and clean burning.

DESCRIPTION OF THE PREFERRED EMBODIMENT

The wire of the present invention is designed to have a minimized dielectric constant (DK). A minimized DK has several significant effects on the electrical properties of the wire. Signal throughput is increased while signal attenuation is decreased. In addition, delay skew in twisted pair applications is minimized. The minimized DK is achieved through the utilization of an improved insulated conductor or isolated core as described below.

Figure 1:
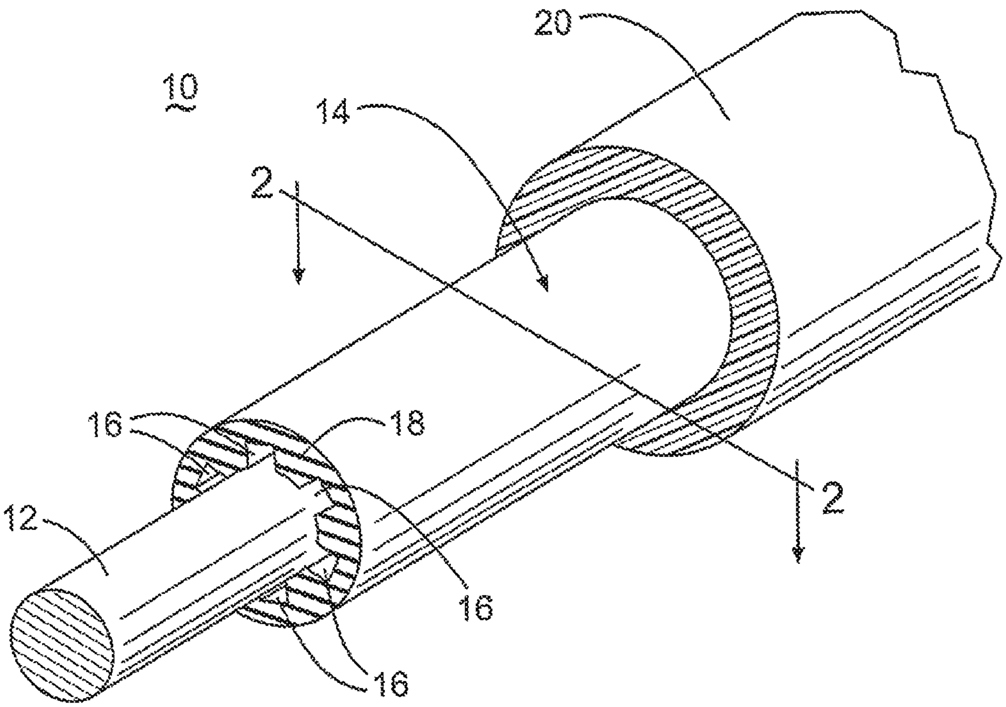
FIG. 1 shows a perspective, stepped cut away view of a wire according to the present invention.
Figure 8:
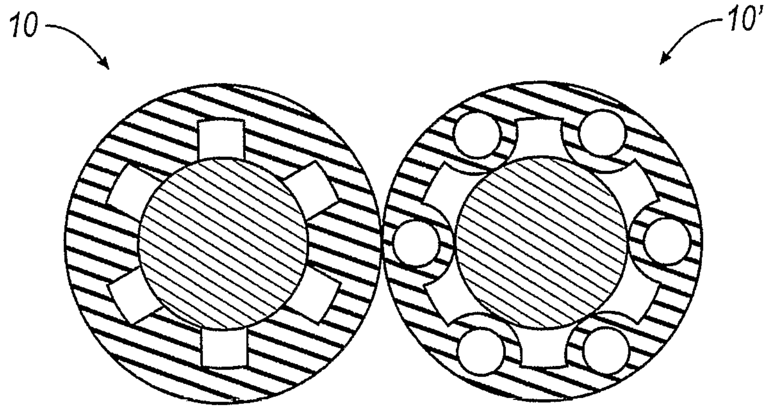
FIG. 8 shows a cross-section of a twisted wire pair.

A wire 10 of the present invention has a conductor 12 surrounded by a primary insulation 14, as shown in FIG. 1. Insulation 14 includes at least one channel 16 that runs the length of the conductor. Multiple channels may be circumferentially disposed about conductor 12. The multiple channels are separated from each other by legs 18 of insulation. The individual wires 10 may be twisted together to form a twisted pair as shown in FIG. 8. Twisted pairs, in turn, may be twisted together to form a multi-pair cable. Any plural number of twisted pairs may be utilized in a cable. Alternatively, the channeled insulation may be used in coaxial, fiber optic or other styles of cables. An outer jacket 20 is optionally utilized in wire 10. Also, an outer jacket may be used to cover a twisted pair or a cable. Additional layers of secondary, un-channeled insulation may be utilized either surrounding the conductor or at other locations within the wire. In addition, twisted-pairs or cables may utilize shielding.

Figure 2:
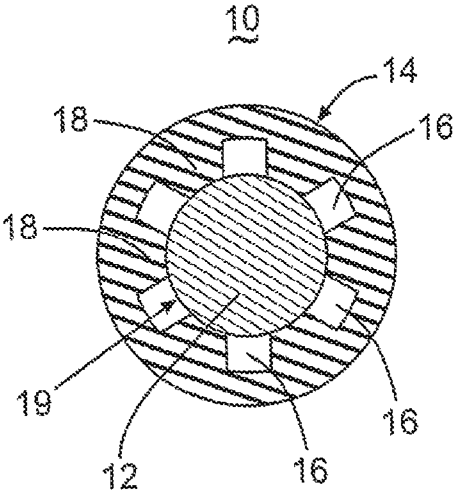
FIG. 2 shows a cross-section of a wire according to the present invention.
Figure 2A:
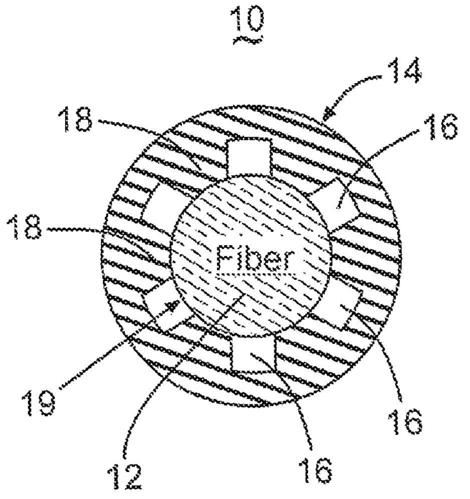
FIG. 2A shows a diagrammatic view of a fiber optic cable comprising a fiber optic conductor according to inventive aspects of the present disclosure.

The cross-section of one aspect of the present invention is seen in FIG. 2. The wire 10 includes a conductor 12 surrounded by an insulation 14. The insulation 14 includes a plurality of channels 16 disposed circumferentially about the conductor 12 that are separated from each other by legs 18. Channels 16 may have one side bounded by an outer peripheral surface 19 of the conductor 12. Channels 16 of this aspect generally have a cross-sectional shape that is rectangular.

Figure 3:
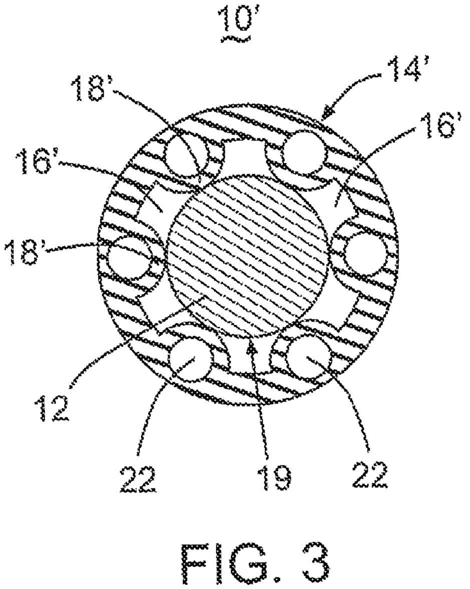
FIG. 3 shows a cross-section of another wire according to the present invention.

The cross-section of another aspect of the present invention is seen in FIG. 3. The insulation 14' includes a plurality of channels 16' that differ in shape from the channels 16 of the previous aspect. Specifically, the channels 16' have curved walls with a flat top. Like the previous aspect, the channels 16' are circumferentially disposed about the conductor 12 and are separated by legs 18'. Also in this aspect, the insulation 14' may include a second plurality of channels 22. The second plurality of channels 22 may be surrounded on all sides by the insulation 14'. The channels 16' and 22 are preferably used in combination with each other.

The channeled insulation protects both the conductor and the signal being transmitted thereon. The composition of the insulation 14,14' is important because the DK of the chosen insulation will affect the electrical properties of the overall wire 10. The insulation 14,14' is preferably an extruded polymer layer that is formed with a plurality of channels 16,16' separated by intervening legs 18,18' of insulation. Channels 22 are also preferably formed in the extruded polymer layer.

Any of the conventional polymers used in wire and cable manufacturing may be employed in the insulation 14,14', such as, for example, a polyolefin or a fluoropolymer. Some polyolefins that may be used include polyethylene and polypropylene. However, when the cable is to be placed into a service environment where good flame resistance and low smoke generation characteristics are required, it may be desirable to use a fluoropolymer as the insulation for one or more of the conductors included in a twisted pair or cable. While foamed polymers may be used, a solid polymer is preferred because the physical properties are superior and the required blowing agent can be eliminated.

In addition, fluoropolymers are preferred when superior physical properties, such as tensile strength or elongation, are required or when superior electrical properties, such as low DK or attenuation, are required. Furthermore, fluoropolymers increase the crush strength of the insulated conductor, while also providing an insulation that is extremely resistant to invasion by contaminants, including water.

As important as the chemical makeup of the insulation 14,14' are the structural features of the insulation 14,14'. The channels 16,16' and 22 in the insulation generally have a structure where the length of the channel is longer than the width, depth or diameter of the channel. The channels 16,16' and 22 are such that they create a pocket in the insulation that runs from one end of the conductor to the other end of the conductor. The channels 16,16' and 22 are preferably parallel to an axis defined by the conductor 12.

Air is preferably used in the channels; however, materials other than air may be utilized. For example, other gases may be used as well as other polymers. The channels 16,16' and 22 are distinguished from other insulation types that may contain air. For example, channeled insulation differs from foamed insulation, which has closed-cell air pockets within the insulation. The present invention also differs from other types of insulation that are pinched against the conductor to form air pockets, like beads on a string. Whatever material is selected for inclusion in the channels, it is preferably selected to have a DK that differs from the DK of the surrounding insulation.

Preferably, the legs 18,18' of the insulation 14,14' abut the outer peripheral surface 19 of the conductor 12. In this way, the outer peripheral surface 19 of the conductor 12 forms one face of the channel, as seen in FIGS. 1-3. At high frequencies, the signal travels at or near the surface of the conductor 12. This is called the 'skin effect'. By placing air at the surface of the conductor 12, the signal can travel through a material that has a DK of 1, that is, air. Thus, the area that the legs 18,18' of the insulation 14,14' occupy on the outer peripheral surface 19 of the conductor 12 is preferably minimized. This may be accomplished by maximizing the cross-sectional area of the channels 16,16', and consequently minimizing the size of legs 18,18', utilized in the insulation 14,14'. Also, the shape of the channels 16,16' may be selected to minimize the legs 18,18' contact area with the conductor 12 and to increase the strength of the channels.

A good example of maximizing cross-sectional area and minimizing the occupied area can be seen in FIG. 3, where channels 16' with curved walls are utilized. The walls curve out to give channels an almost trapezoidal shape. The almost trapezoidal channels 16' have larger cross-sectional areas than generally rectangular channels 16. Furthermore, the curve walls of adjacent channels cooperate to minimize the size of the leg 18' that abuts the outer peripheral surface 19 of the conductor 12.

Furthermore, the area that the legs 18,18' of the insulation 14 occupy on the outer peripheral surface 19 of the conductor 12 can be minimized by reducing the number of channels 16,16' utilized. For example instead of the six channels 16,16' illustrated in FIGS. 2-3, five or four channels may be used.

Preferably, the area occupied by the legs 18,18' on the outer peripheral surface 19 of the conductor 12 is less than about 75% of the total area, with legs that occupy less than about 50% being more preferred. Insulation with legs that occupy about 35% of the area of outer peripheral surface is most preferred, although areas as small as 15% may be suitable. In this way, the area of the outer peripheral surface where the signal can travel through air is maximized. Stated alternatively, by minimizing the area occupied by the legs, the skin effect is maximized.

A good example of increasing strength through channel shape is through the use of an arch. An arch has an inherent strength that improves the crush resistance of the insulated conductor, as discussed in more detail below. Arch shaped channels may also have economic benefits as well. For example, because the insulation is stronger, less insulation may be needed to achieve the desired crush resistance. The channels may have other shapes that are designed to increase the strength of the channels.

The channels 22 also minimize the overall DK of the insulation 14' by including air in the insulation 14'. Furthermore, the channels 22 can be utilized without compromising the physical integrity of the wire 10.

The cross-sectional area of the channels should be selected to maintain the physical integrity of wire. Namely, it is preferred that any one channel not have a cross-sectional area greater than about 30% of the cross-sectional area of the insulation.

Through the use of the wire 10 with channeled insulation 14,14', a delay skew of less than 20 ns is easily achieved in twisted pair or multi-pair cable applications, with a delay skew of 15 ns preferred. A delay skew of as small as 5 ns is possible if other parameters, e.g., lay length and conductor size, are also selected to minimize delay skew.

Also, the lowered DK of the insulation 14,14' is advantageous when used in combination with a cable jacket. Typically, jacketed plenum cables use a fire resistant PVC (FRPVC) for the outer jacket. FRPVC has a relatively high DK that negatively affects the impedance and attenuation values of the jacketed cable, but it is inexpensive. The insulation 14,14', with its low DK, helps to offset the negative effects of the FRPVC jacket. Practically, a jacketed cable can be given the impedance and attenuation values more like an unjacketed cable.

Indeed, the low DK provided by the insulation 14,14' also increases the signal speed on the conductor, which, in turn, increases the signal throughput. Signal throughput of at least 450 ns for 100 meters of twisted pair is obtained, while signal speeds of about 400 ns are possible. As signal speeds increase, however, the delay skew must be minimized to prevent errors in data transmission from occurring.

Furthermore, since the DK of the channeled insulation is proportional to the cross-sectional area of the channels, the signal speed in a twisted pair is also proportional to the cross-sectional area of the channels and thus easily adjustable. The lay length, conductor diameter, and the insulator thickness need not be changed. Rather, the cross-sectional area of the channels can be adjusted to obtain the desired signal speed in balance with other physical and electrical properties of the twisted pair. This is particularly useful in a multi-pair cable. The delay skew of the cable may be thought of as the difference in signal speed between the fastest twisted pair and the slowest twisted pair. By increasing the cross-sectional area of the channels in the insulation of the slowest twisted pair, its signal speed can be increased and thus more closely matched to the signal speed of the fastest twisted pair. The closer the match, the smaller the delay skew.

As compared to un-channeled insulation, channeled insulation has a reduced dissipation factor. The dissipation factor reflects the amount of energy that is absorbed by the insulation over the length of the wire and relates to the signal speed and strength. As the dissipation factor increases, the signal speed and strength decrease. The skin effect means that a signal on the wire travels near the surface of the conductor. This also happens to be where the dissipation factor of the insulation is the lowest so the signal speed is fastest here. As the distance from the conductor increases, the dissipation factor increases and the signal speed begins to slow. In an insulated conductor without channels, the difference in the dissipation factor is nominal. With the addition of channels to the insulation, the dissipation factor of the insulation dramatically decreases because of the lower DK of the medium through which the signal travels. Thus, incorporation of channels creates a situation where the signal speed in the channels is significantly different, i.e. faster, than the signal speed in the rest of the insulation. Effectively, an insulated conductor is created with two different signal speeds where the signal speeds can differ by more than about 10%.

Placement of the channels 16,16' adjacent to the outer peripheral surface 19 of the conductor 12 also does not compromise the physical characteristics of the insulated conductor, which in turn preserves the electrical properties of the insulated conductor. Because the exterior surface of the insulated conductor is intact, there is no opportunity for contaminants to become lodged in the channels. The consequence is that the DK of the insulation does not vary over the length of the cable and the DK is not negatively affected by the contaminants.

By placing the channels near the conductor, the crush strength of the insulated conductor is not compromised. Namely, sufficient insulation is in place so that the channels are not easily collapsed. Further, the insulation also prevents the shape of the channels from being significantly distorted when torsional stress is applied to the insulated conductor. Consequently, normal activities, i.e., manufacture, storage and installation, do adversely affect the physical properties, and by extension, the electrical properties, of the insulated conductor of the present invention.

Besides the desirable effects on the electrical properties of the wire 10, the insulation 14,14' has economic and fire prevention benefits as well. The channels 16,16' and 22 in the insulation 14,14' reduce the materials cost of manufacturing the wire 10. The amount of insulation material used for the insulation 14,14' is significantly reduced compared to non-channeled insulation and the cost of the filler gas is free. Stated alternatively, more length of the insulation 14,14' can be manufactured from a predetermined amount of starting material when compared to non-channeled insulation. The number and cross-sectional area of the channels 16,16' and 22 will ultimately determine the size of the reduction in material costs.

The reduction in the amount of material used in the insulation 14,14' also reduces the fuel load of the wire 10. Insulation 14,14' gives off fewer decomposition byproducts because it has comparatively less insulation material per unit length. With a decreased fuel load, the amount of smoke given off and the rate of flame spread and the amount of heat generated during burning are all significantly decreased and the likelihood of passing the pertinent fire safety codes, such as The National Fire Prevention Association (NFPA) NFPA 255,259 and 262, is significantly increased. A comparison of the amount of smoke given off and the rate of flame spread may be accomplished through subjecting the wire to be compared to a Underwriters Laboratory (UL) UL 910 Steiner Tunnel burn test. The Steiner Tunnel burn test serves as the basis for the NFPA 255 and 262 standards. In every case, a wire with channeled insulation where the channels contain air will produce at least 10% less smoke than wire with un-channeled insulation. Likewise, the rate of flame spread will be at least 10% less than that of un-channeled insulation.

A preferred embodiment of the present invention is a wire 10 with insulation 14,14' made of fluoropolymers where the insulation is less than about 0.010 in thick, while the insulated conductor has a diameter of less than about 0.042 in. Also, the overall DK of the wire is preferably less than about 2.0, while the channels have a cross-sectional area of at least $2.0\times10^{-5}$ int.

The preferred embodiment was subjected to a variety of tests. In a test of water invasion, a length of channeled insulated conductor was placed in water heated to 90° C. and held there for 30 days. Even under these adverse conditions, there was no evidence of water invasion into the channels. In a torsional test, a 12 inch length of channeled insulated conductor was twisted 180° about the axis of the conductor. The channels retained more than 95% of their untwisted cross-sectional area. Similar results were found when two insulated conductors were twisted together. In a crush strength test, the DK of a length of channeled insulated conductor was measured before and after crushing. The before and after DK of the insulated conductor varied by less the 0.01.

While the insulation is typically made of a single color of material, a multi-colored material may be desirable. For instance, a stripe of colored material may be included in the insulation. The colored stripe primarily serves as a visual indicator so that several insulated conductors may be identified. Typically, the insulation material is uniform with only the color varying between stripes, although this need not be the case. Preferably, the stripe does not interfere with the channels.

Examples of some acceptable conductors 12 include solid conductors and several conductors twisted together. The conductors 12 may be made of copper, aluminum, copper-clad steel and plated copper. It has been found that copper is the optimal conductor material. In addition, the conductor 12 may be glass or plastic fiber, such that fiber optic cable is produced.

Figure 7:
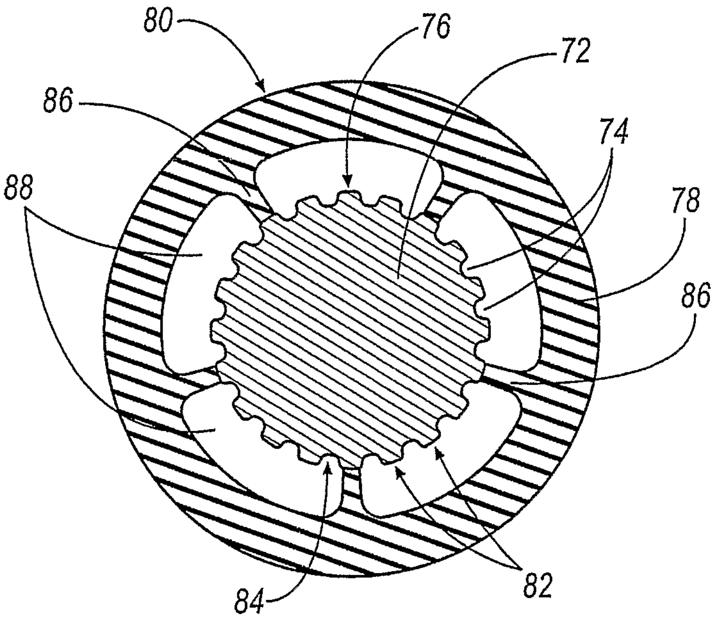
FIG. 7 shows a cross-section of a wire with a channeled conductor according to the present invention.

The wire may include a conductor 72 that has one or more channels 74 in its outer peripheral surface 76, as seen in FIG. 7. In this particular aspect of the invention, the channeled conductor 72 is surrounded by insulation 78 to form an insulated, channeled conductor 80. The individual insulated conductors may be twisted together to form a twisted pair. Twisted pairs, in turn, may be twisted together to form a multi-pair cable. Any plural number of twisted pairs may be utilized in a cable.

The one or more channels 74 generally run parallel to the longitudinal axis of the wire, although this is not necessarily the case. With a plurality of channels 74 arrayed on the outer peripheral surface 76 of the conductor 72, a series of ridges 82 and troughs 84 are created on the conductor.

As seen in FIG. 7, the channeled conductor 72 may be combined with channeled insulation 78, although this is not necessarily the case. The legs 86 of the channeled insulation 78 preferably contact the channeled conductor 72 at the ridges 82. This alignment effectively combines the channels 88 of the insulation 78 with the channels 74 of the conductor, creating a significantly larger channel. The larger channel may result in a synergistic effect that enhances the wire beyond the enhancements provided by either channeled insulation or channeled conductor individually.

A channeled conductor has two significant advantages over smooth conductors. First, the surface area of the conductor is increased without increasing the overall diameter of the conductor. Increased surface area is important because of the skin effect, where the signal travels at or near the outer peripheral surface of the conductor. By increasing the surface area of the conductor, the signal is able to travel over more area while the size of the conductor remains the same. Compared to a smooth conductor, more signal can travel on the channeled conductor. Stated alternatively, a channeled conductor has more capacity to transmit data than a smooth conductor. Second, the use of air or other low DK material in the channels of the conductor reduces the effective DK of the wire including channeled conductors. As discussed above with the channeled insulation, the lower overall DK of the wire is advantageous for several reasons including increased signal speed and lower attenuation and delay skew. Furthermore, the use of a low DK material, e.g., air, in the channels of the conductor also enhances the skin effect of signal travel. This means that the signal travels faster and with less attenuation. Taken together, the two advantages of channeled conductors over smooth conductors create a wire that has more capacity and a faster signal speed.

Channeled conductors also have other incidental advantages over smooth conductors such as reduced material cost because more length of the channeled conductor can be manufactured from a predetermined amount of starting material when compared to non-channeled or smooth conductors. The number and cross-sectional area of the channels will ultimately determine the size of the reduction in material costs.

The outer jacket 20 may be formed over the twisted wire pairs and as can a foil shield by any conventional process. Examples of some of the more common processes that may be used to form the outer jacket include injection molding and extrusion molding. Preferably, the jacket is comprised of a plastic material, such as fluoropolymers, polyvinyl chloride (PVC), or a PVC equivalent that is suitable for communication cable use.

Figure 6:
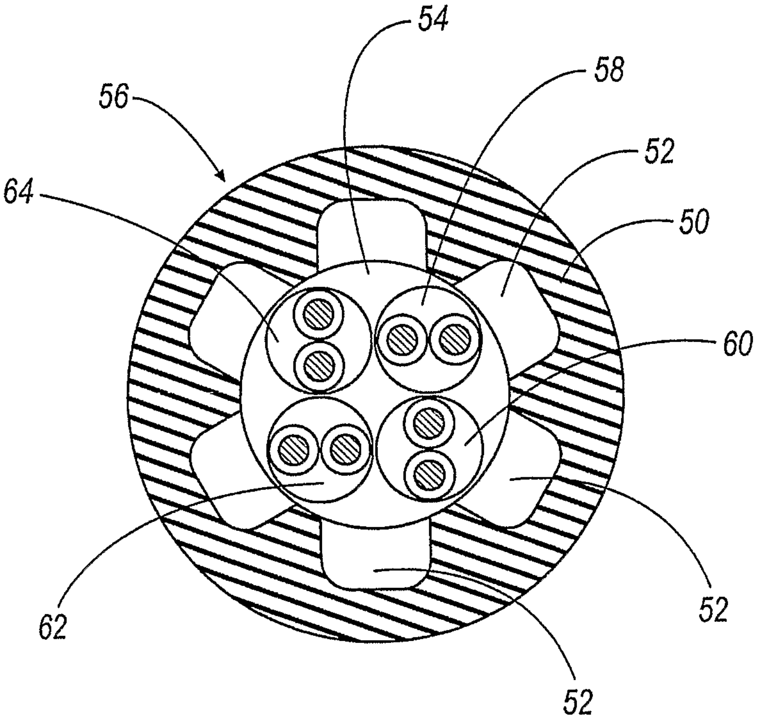
FIG. 6 shows a cross-section of a wire with a channeled jacket according to the present invention.

As noted above, the wire of the present invention is designed to have a minimized DK. In addition to the use of channeled insulation and conductor, a wire with a minimized DK can be achieved through the utilization of an improved isolated core. Like the insulation and conductor, the wire may include an outer jacket 50 that includes channels 52, as seen in FIG. 6. In this particular aspect of the invention, the channeled jacket 50 surrounds a core element 54 to form an isolated core 56. The core element is at least one insulated conductor, typically, the core element includes a plurality of twisted pairs. Additionally, the core element may include any combination of conductors, insulation, shielding and separators as previously discussed. For example, FIG. 6 shows an isolated core 56 with four twisted pairs 58,60, 62 and 64 twisted around each other and surrounded by a channeled jacket 50.

Generally, the entire discussion above concerning the chemical and structural advantages for channeled insulation also pertains to channeled jackets; that is, a jacket with a low DK is desirable for the same reasons as insulation with a low DK is desirable. The low DK of the jacket imparts to the wire similar advantageous physical, electrical and transmission properties as the channeled insulation does. For example, the channels in the jacket lower the overall DK of the jacket, which increases signal speed and decreases attenuation for the jacketed wire as a whole. Likewise, the dissipation factor of the jacket is significantly reduced through the use of channels, thus increasing signal speed near the core element. The signal speed away from the core element is not increased as much, thus giving a wire that effectively has two different signal speeds; an inner signal speed and an outer signal speed. The difference in signal speed may be significant; e.g., the inner signal speed may be may be more than about 2% faster than the outer signal speed. Preferably, the difference in signal speed is on the order of about 5%, 10% or more. Stated alternatively, the channeled jacket may have more than one DK such that the jacket includes concentric portions that have different DKs and thus different signal speeds. In addition to the speed differences observed in the jacket, differences in signal speed may also be observed between inner and outer portions of channeled insulation.

The dissipation factor of the jacket or insulation may be adjusted by selecting a composite density of the materials for the inner portion and the outer portion. As the name suggests, the composite density is the weight of material, either insulation or jacket, for a given volume of material. A material with a lower composite density will have a lower dissipation factor as compared with a higher composite density. For example, a channeled jacket where the channels contain air will have a much lower composite density than an un-channeled jacket. In the channeled jacket, significant portions of the jacket material is replaced by much lighter air, thus reducing the composite density of the jacket, which in turn reduces the dissipation factor of the jacket. Differences in composite density may be accomplished with means other than channels in the jacket or insulation.

As with the channeled insulation, it is desirable to maximize cross-sectional area of the channels in the jacket and minimize the area the legs of the jacket occupy on the core element, all the while maintaining the physical integrity of the wire. Fire protection and economic advantages are also seen with channeled jackets as compared to un-channeled jackets.

In a wire with a preferred balance of properties, the channeled jacket has a plurality of channels, but no one of the channels has a cross-sectional area of greater than about 30% of the cross-sectional area of the jacket. Furthermore, the preferred channel has a cross-sectional area of at least $2.0\times10^{-5}$ int. One useful wire has an isolated core diameter of less than about 0.25 in, while the preferred channeled jacket thickness is less than about 0.030 in.

In a preferred aspect of the present invention, the wire includes one or more components with channels, such that the wire includes a channeled conductor, channeled insulation or a channeled jacket. In a most preferred aspect, the wire includes a combination of channeled components, including those embodiments where all three of the conductor, insulation and jacket are channeled. When the channeled components are used in combination, a wire is achieved that has a DK that is significantly less than a comparably sized wire without channels.

The present invention also includes methods and apparatuses for manufacturing wires with channeled insulation. The insulation is preferably extruded onto the conductor using conventional extrusion processes, although other manufacturing processes are suitable. In a typical insulation extrusion apparatus, the insulation material is in a plastic state, not fully solid and not fully liquid, when it reaches the crosshead of the extruder. The crosshead includes a tip that defines the interior diameter and physical features of the extruded insulation. The crosshead also includes a die that defines the exterior diameter of the extruded insulation. Together the tip and die help place the insulation material around the conductor. Known tip and die combinations have only provided an insulation material with a relatively uniform thickness at a cross-section with a tip that is an unadulterated cylinder. The goal of known tip and die combinations is to provide insulation with a uniform and consistent thickness. In the present invention, the tip provides insulation with interior physical features; for example, channels. The die, on the other hand, will provide an insulation relatively constant in exterior diameter. Together, the tip and die combination of the present invention provides an insulation that has several thicknesses.

Figure 4:
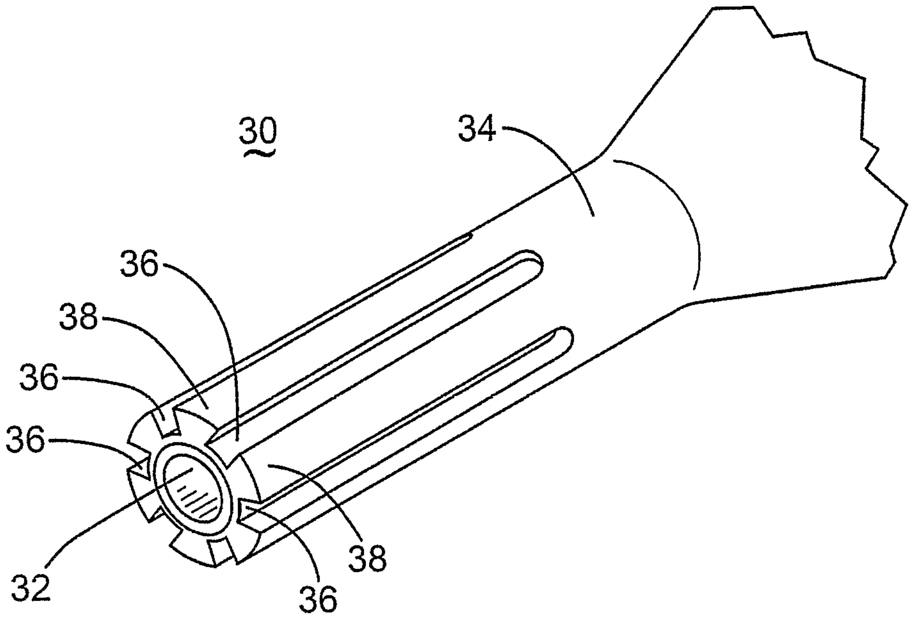
FIG. 4 shows a perspective view of an extrusion tip for manufacturing a wire according to the present invention.

The insulation 14 shown in FIG. 2 is achieved through the use of an extrusion tip 30 as depicted in FIG. 4. The tip 30 includes a bore 32 through which the conductor may be fed during the extrusion process. A land 34 on the tip 30 includes a number of grooves 36. In the extrusion process, the tip 30, in combination with the die, fashions the insulation 14 that then may be applied to the conductor 12. Specifically, in this embodiment, the grooves 36 of the land 34 create the legs 18 of the insulation 14 such that the legs 18 contact the conductor 12 (or a layer of an un-channeled insulation). The prominences 38 between the grooves 36 on the land 34 effectively block the insulation material, thus creating the channels 16 in the insulation material as it is extruded.

Figure 5:
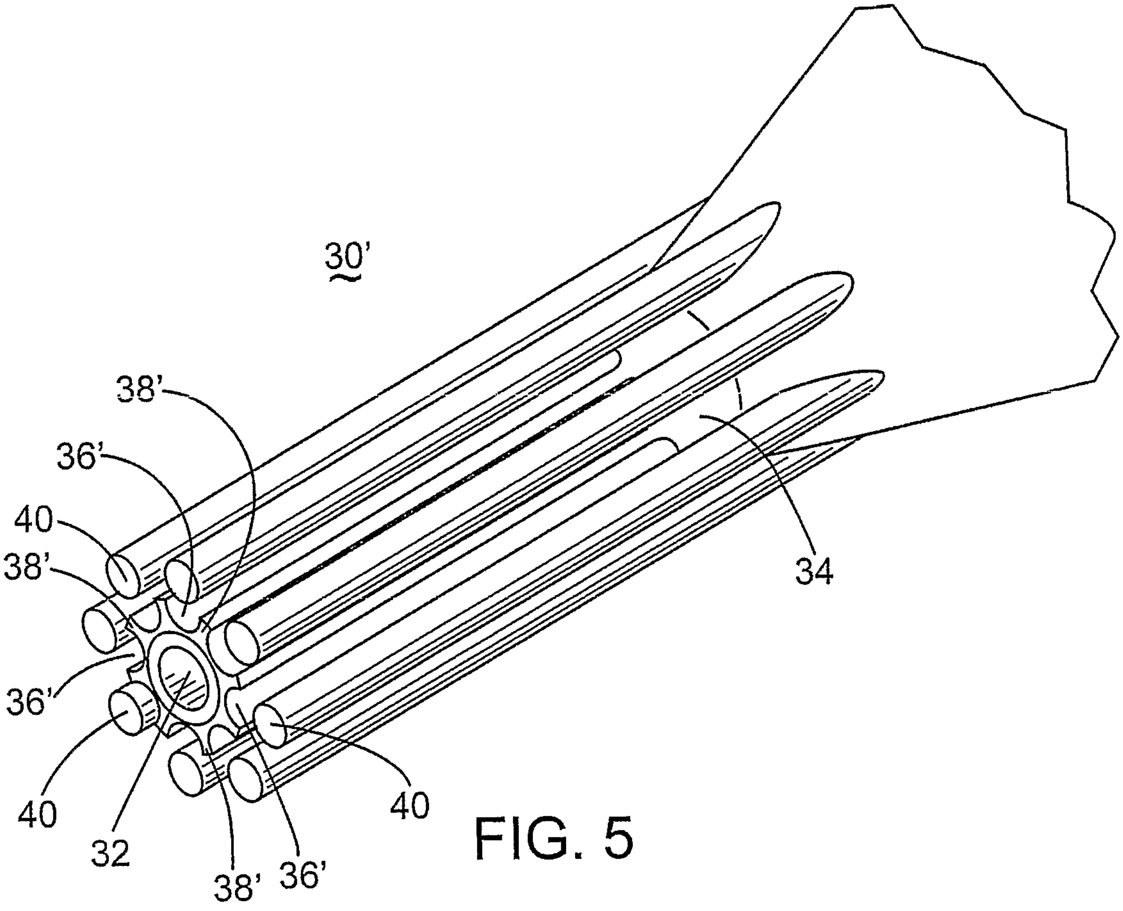
FIG. 5 shows a perspective view of another extrusion tip for manufacturing a wire according to the present invention.

The insulation 14' shown in FIG. 3 is achieved through the use of an extrusion tip as depicted in FIG. 5. The tip 30' includes a bore 32 through which the conductor may be fed during the extrusion process. Like the tip of FIG. 4, the land 34 of the tip 30' includes a number of grooves 36' separated by prominences 38'. In this embodiment, the grooves 36' are concave, while the prominences 38' are flat topped. Together, the grooves 36' and prominences 38' of the land 34 form convex legs 18' and flat-topped channels 16' of the insulation. In addition, the tip 30' also includes a number of rods 40 spaced from the land 34. The rods 40 act similar to the prominences 38' and effectively block the insulation material, thus creating long channels 22 surrounded by insulation 14', as seen in FIG. 3.

In addition to providing a reduced cost, weight and size, and the performance enhancements discussed above, there are further advantages to wire 10. The wire of the present invention has also been found to provide higher temperature resistance when compared to the wire known in the art. The wire provides enhanced performance when used either in a high temperature environment or when the conductor itself generates significant heat during operation. While these events are atypical with most communication wire, it is a significant issue for other types of wires such as those used in the environment of an internal combustion engine or under high amperage conditions where insulation is nevertheless required. The use of channels including a gas such as air enhances heat dissipation of the conductor while also providing improved thermal resistance to the overall wire.

Moreover, additional advantages of the present invention include enhanced wire flexibility, permitting the wire to be increasingly flexed while avoids kinking or potential wire damage. Moreover, the presence of gas-filled channels disposed between the insulation and the conductor even provides improved stripability. Thus, the insulation may be more readily separated from the end of the wire to expose the underlying conductor when the wire has to be attached to a mating component such as a twist-on wire connector.

While the invention has been specifically described in connection with certain specific embodiments thereof, it is to be understood that this is by way of illustration and not of limitation, and the scope of the appended claims should be construed as broadly as the prior art will permit.

What is claimed is:

1. A fiber optic cable comprising:

a fiber optic conductor;

a solid polymeric non-foam insulation fully surrounding the fiber optic conductor, wherein the insulation is an extruded polymer that includes a plurality of channels formed integrally therewith extending generally along a longitudinal axis of said fiber optic cable, the plurality of channels separated from each other by legs defined by the insulation, the legs formed integrally with and from the same extruded polymer defining the insulation, wherein each of the channels has one side bounded by an outer peripheral surface of the fiber optic conductor such that every one of the legs defining the channels abuts the outer peripheral surface of the fiber optic conductor at locations uniformly spaced about the outer peripheral surface of the fiber optic conductor, wherein the legs cooperatively make contact with at least 35% of a surface area defined by the outer peripheral surface of the fiber optic conductor; and an outer jacket fully surrounding the solid polymeric non-foam insulation that fully surrounds the fiber optic conductor, wherein a total cross-sectional diameter of the fiber optic conductor and the solid polymeric non-foam insulation surrounding the fiber optic conductor is less than about 0.042 inches and wherein the solid polymeric non-foam insulation surrounding the fiber optic conductor is less than about 0.010 inches in thickness in a radial direction.

2. The fiber optic cable of claim 1, wherein each of the plurality of channels includes a gas.

3. The fiber optic cable of claim 2, wherein the gas within the plurality of channels is air.

4. The fiber optic cable of claim 1, wherein the fiber optic conductor and the insulation surrounding the fiber optic conductor and including the plurality of channels extending generally along the longitudinal axis of the fiber optic cable cooperatively define an insulated conductor that has an overall dielectric constant of less than approximately 2.0.

5. The fiber optic cable of claim 1, wherein no one of the plurality of channels has a cross-sectional area greater than about 30% of a cross-sectional area of the insulation.

6. The fiber optic cable of claim 1, wherein the fiber optic conductor and the insulation surrounding the fiber optic conductor cooperatively define an insulated conductor, wherein the insulated conductor passes a test selected from the group consisting of NFPA 255, NFPA 259, NFPA 262, or combinations thereof.

7. The fiber optic cable of claim 1, wherein the fiber optic conductor and the insulation surrounding the fiber optic conductor cooperatively define an insulated conductor, wherein the insulated conductor generates at least 10% less smoke when burned according to a UL 910 Steiner Tunnel test when compared to an insulated conductor without channels in its insulation.

8. The fiber optic cable of claim 1, wherein the fiber optic conductor and the insulation surrounding the fiber optic conductor cooperatively define an insulated conductor, wherein the insulated conductor spreads flame at a rate at least 10% slower when burned according to a UL 910 Steiner Tunnel test when compared to an insulated conductor without channels in its insulation.

9. The fiber optic cable of claim 1, wherein a shape of each of the plurality of channels is selected from the group consisting of rectangular, trapezoidal, and arched.

10. The fiber optic cable according to claim 1, wherein the plurality of channels includes at least four channels.

11. The fiber optic cable according to claim 1, wherein the fiber optic conductor is formed of glass.

12. The fiber optic cable according to claim 1, wherein the fiber optic conductor is formed of plastic.

13. The fiber optic cable according to claim 1, wherein the solid polymeric non-foam insulation fully surrounding the fiber optic conductor includes a polyolefin material.

14. The fiber optic cable according to claim 1, wherein the solid polymeric non-foam insulation fully surrounding the fiber optic conductor includes a fluoropolymer material.

* * * * *